United States Patent [19]

Fuchs

[11] Patent Number: 5,641,073
[45] Date of Patent: Jun. 24, 1997

[54] ALIGNING OF ELONGATED OBJECTS

[75] Inventor: Milan Fuchs, Winchester, England

[73] Assignee: Radix Systems Limited, United Kingdom

[21] Appl. No.: 314,214

[22] Filed: Sep. 28, 1994

[30] Foreign Application Priority Data

Oct. 1, 1993 [GB] United Kingdom ............ 9320279

[51] Int. Cl.$^6$ ............................................. B07B 13/05
[52] U.S. Cl. ............................. 209/674; 198/396
[58] Field of Search ..................... 198/382, 396; 209/674

[56] References Cited

U.S. PATENT DOCUMENTS

| | | | |
|---|---|---|---|
| 3,339,703 | 9/1967 | Pinkham et al. | 198/396 |
| 3,347,368 | 10/1967 | Mogensen | 209/674 |
| 3,776,346 | 12/1973 | Dubuit | 198/396 |
| 4,376,481 | 3/1983 | Franklin | 198/382 |
| 4,494,919 | 1/1985 | Knudson et al. | 198/382 |
| 4,664,790 | 5/1987 | Lundqvist | 209/674 |
| 4,717,027 | 1/1988 | Laure et al. | 209/620 |
| 4,832,205 | 5/1989 | Backus | 198/382 |
| 5,058,749 | 10/1991 | Jong | 209/539 |
| 5,117,983 | 6/1992 | Marrs | 209/674 |

FOREIGN PATENT DOCUMENTS

| | | | |
|---|---|---|---|
| 1821536 | 10/1969 | Germany | B65H 9/00 |
| 1213370 | 11/1970 | United Kingdom | B65H 9/00 |

*Primary Examiner*—Joseph E. Valenza
*Attorney, Agent, or Firm*—Reese Taylor

[57] ABSTRACT

Elongated objects are aligned by being placed on a vibratory grid having elongated holes arranged parallel to one another and to the direction of advance and removal of the aligned objects. They drop through the grid onto conveying means which then moves them away in the desired direction of removal. This removal on the conveying means can be relatively fast. Desirably the vibratory grid is in the form of a number of parallel but spaced round bars which quickly and effectively align the elongated objects as they pass down through the spaces between the bars.

18 Claims, 1 Drawing Sheet

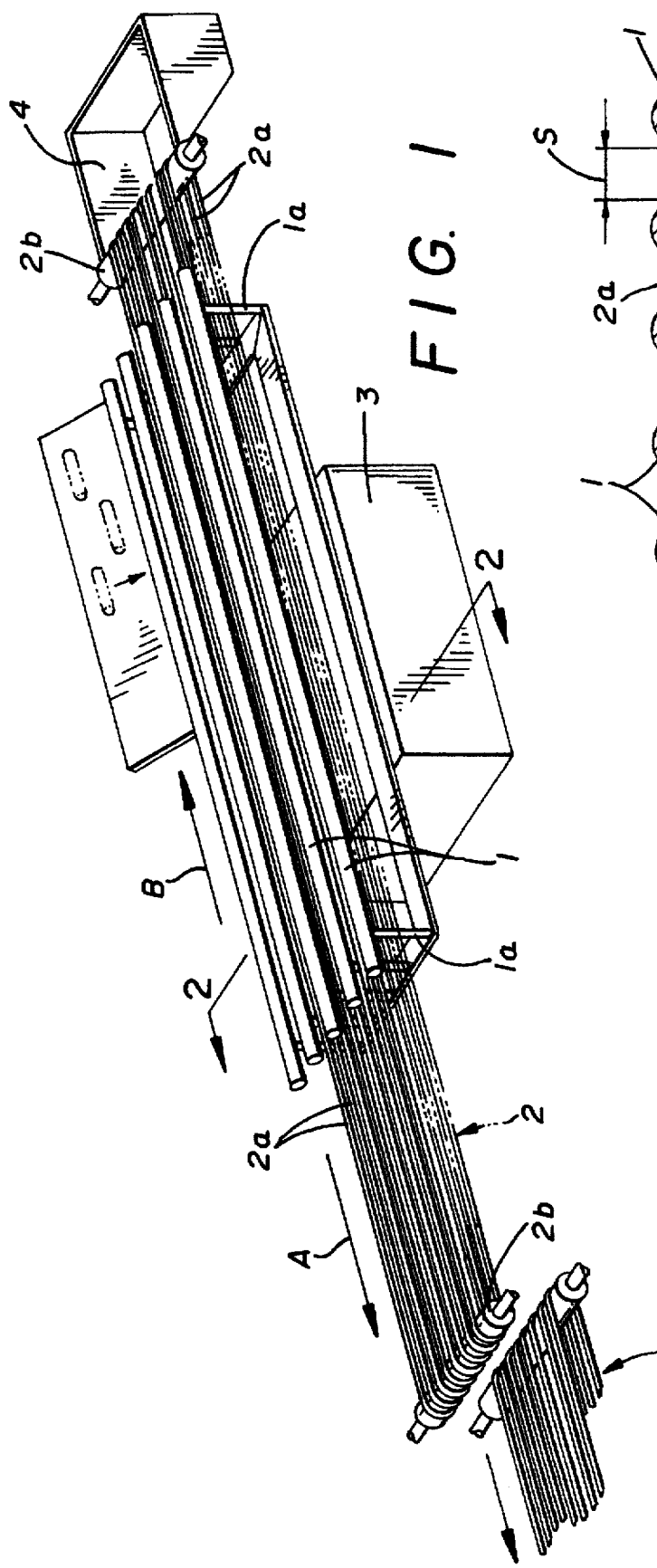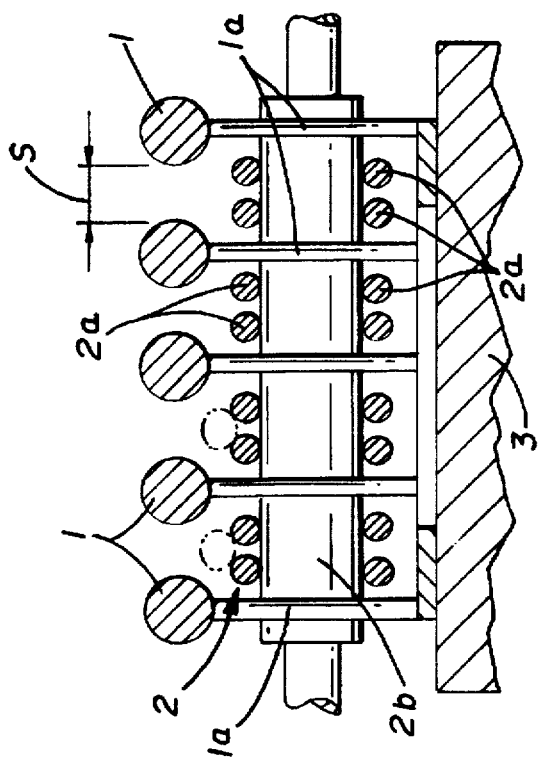

ALIGNING OF ELONGATED OBJECTS

TECHNICAL FIELD

This invention relates to the aligning, or "laning" as it is often called, of elongated objects. In particular, the invention relates to a laning apparatus and method for aligning such elongated materials.

BACKGROUND OF THE INVENTION

When objects are to be sorted or checked, if they are elongated in one dimension it is highly desirable that they all be aligned in the same general direction, e.g., with their elongated axes parallel. This is particularly the case when such objects need to be sorted and defective objects rejected.

The invention is particularly, although not exclusively, useful in relation to objects which are substantially cylindrical and, in particular, of an elongated cylindrical nature, such as sausages. However, the objects need not be truly cylindrical and more conically shaped objects such as carrots can also equally be aligned by adopting the principles of the invention.

Presently known systems use a vibratory conveyor on to which such objects are dropped, and their alignment is achieved by providing within the top surfaces of the conveyor, grooves which extend lengthwise in the direction of advance of the conveyor. The elongated objects then progressively align themselves and drop into these grooves as they advance along the vibratory conveyor.

The problem with such a simple arrangement however is its overall capacity. Thus the speed of advance of a vibratory conveyor is relatively low and is in any case limited by the necessity to allow quite a long length of conveyor or, in other words, time for the objects to become aligned and to fit into the elongated grooves. In practice, this means that one needs to use a very wide vibratory tray to cope with the amount of material to be laned, but even then there are problems in that sometimes the objects lay upon one another in the grooves, known as a double stacking problem, and in any case the speed of advance is still very slow.

To overcome the problem of double stacking, it is normal to have a number of vibratory conveyors, usually three, positioned one after the other with the aligned objects from the first conveyor falling on to the second, and from the second on to the third, the hope and expectation here being that eventually along the overall length of the combined conveyor, the double stacking will be avoided because at some stage, a second or third item laying on a first will fall back and rest at the bottom of a groove on its own. Such an arrangement can reduce or avoid double stacking but does nothing to increase the speed of sorting.

Attempts to increase the speed have included the provision of upstanding pins on the vibratory conveyor which act as something of a block to objects which reach the pin in a direction somewhat transverse of the elongated grooves. Then, provided the object hits the pin away from its centre of gravity, the pin will tend to cause the object to align as it passes the pin, but there can still be problems of blockage in the event that there are a relatively large number of such objects which are not aligned by the time they reach the pin.

The invention has therefore been made with these problems in mind, and aims to provide apparatus and a method for aligning such objects far more quickly and accurately.

BRIEF SUMMARY OF INVENTION

According to the invention, in one aspect there is provided apparatus for aligning elongated objects comprising an upper vibratory grid having elongated openings arranged substantially parallel to one another and to the direction of advance and removal of the aligned objects, and beneath that vibratory grid, conveying means for removing the objects from beneath the grid in a direction substantially parallel to the aligned direction of such objects achieved as they fall through the elongated openings in the grid on to the conveyor means.

Also, according to another aspect of the invention there is provided a method of aligning elongated objects in which they are subjected to vibration on a vibratory grid having elongated openings substantially aligned in the intended direction of alignment of the objects, and the objects drop through those elongated openings as and when they achieve an appropriate alignment onto conveying means which remove the objects in the direction of their alignment from beneath the vibratory grid.

With such an arrangement, the speed of removal of the items is not now limited by the speed of advance of a vibratory conveyor. Thus, whilst the objects advance over the vibratory grid relatively slowly, or at least those objects which do not already have the correct alignment and so do not immediately fall through the elongated openings, the speed of removal is, by contrast, controlled by the speed of the conveyor means which can in fact be a relatively high speed in comparison with the speed of advance of the vibratory grid. Indeed the faster the conveyor means remove the objects which fall onto it, the less likelihood there is of double stacking. Preferably therefore the conveyor means moves at a linear speed of at least 0.5 m/s, and most preferably to 3 m/s. Also, the invention has the advantage of simplicity, since the various component parts consisting of the vibratory grid and the conveyor means can be very simple.

It is preferred that the vibratory grid be made up of a number of parallel spaced bars. The elongated openings are then defined between adjacent pairs of bars and the spacing between the bars can be chosen so as to fit the width-wise size of the various elongated objects to be aligned. Preferably, the bars are rounded in cross-section, but this is not essential. Desirably however the bars have inclined sides so that the spacing between them, i.e. the width of the elongated openings, progressively decreases in a downward direction. The shaping of the bars as rounded is preferred, however, since this has the advantage that the inclined circular edges of the bars promote the alignment of the elongated object since there are only infinitely small flat areas on which the objects can rest and potentially remain non-aligned. However, as soon as an object tends to move towards an alignment position from a mis-alignment position, the inclined curved edges tend to promote further alignment and the object then quickly and easily slips between the two bars and drops onto the conveyor means beneath.

In some cases it may be desirable for the vibratory grid to advance the objects to be aligned in the same direction as the conveyor means. In other cases the vibratory grid can advance the objects in a direction opposite to the direction of the conveyor means so that if an object is too large to fit the elongated openings, it can be arranged to fall off the back of the grid, say, into a reject bin.

The conveyor means can consist of a simple conveyor belt, but preferably, the conveyor means have an arrangement to ensure that the objects maintain their aligned orientation. This can be achieved by providing a number of elongated recesses or grooves in the belt aligned with the direction of its advance and the alignment direction of the objects as they drop on to the belt. Preferably, however, the conveyor means comprises a plurality of pairs of spaced parallel endless bands. Thus, with that preferred arrangement, the aligned object will drop down onto a pair of spaced parallel bands positioned underneath elongated opening in the vibratory grid and immediately be picked up and supported by the bands but will rest very securely in the channel formed between the two bands, so maintaining its alignment. Desirably these bands are of round cross-section.

There can occasionally still be problems with double stacking, that is to say, one aligned object dropping on to the top of another aligned object. However, by ensuring that the conveyor means move at high speed, the amount of double stacking can be reduced significantly, and in the event that stacking does pose a problem, this can often be avoided by providing a second conveyor means on to which the objects from the conveyor means drop with the second conveyor means working at a higher linear speed than the first so as to space out the objects further in the direction of advance.

BRIEF DESCRIPTION OF THE DRAWINGS

A laning apparatus according to the invention will now be described, by way of example, with reference to the accompanying diagrammatic drawings, in which:

FIG. 1 is a perspective view showing the major components of the apparatus; and

FIG. 2 is a is a part cross-section

DESCRIPTION OF THE PREFERRED EMBODIMENT

As shown in the drawings, a vibratory grid is composed of a number of spaced parallel rods 1. These are held on supports 1a at either end above a vibrator apparatus 3. The latter can be an entirely conventional piece of apparatus which is well known in the art of vibratory trays and conveyors and so does not need further description. Such vibrator apparatus is well known and readily available commercially.

The spacing S between the rods 1 is chosen to suit the cross-sectional size or diameter of the objects to be aligned, which are simply dropped onto the rods 1 from a suitable hopper (not shown).

Beneath the vibratory grid 1 is provided a conveyor means 2. This comprises a number of spaced endless bands 2a which pass around rollers 2b at either end, one of which will be driven to advance the overall conveyor means 2 in the direction of the arrow A. The arrangement is such that there are two bands 2a beneath each opening between an adjacent pair of rods 1. Aligned objects therefore which fall through the openings between adjacent pairs of rods 1 will drop onto, rest between and be supported by a pair of bands 2a. In this way the alignment which has been achieved by the vibratory grid 1 is maintained.

It is preferred that the rods 1 and bands 2a each be of generally circular shape.

As mentioned above, it is possible to advance the objects on the vibratory grid in a direction opposite direction A as shown by the arrow B, so that if an object is too large to fit through the elongated openings, it can be arranged to fall off the back of the grid into reject bin 4.

Also, as previously mentioned, in the unlikely event stacking does become a problem, a second conveyor means 12 can be provided onto which objects from the first conveyor 2 may drop with the second conveyor 12 working at a still higher linear speed.

While the device of the invention has been specifically described by way of a preferred example it will be appreciated that changes and modifications may be made therein without departing from the spirit and the scope of the invention as defined in the appended claims.

I claim:

1. Apparatus for aligning elongated objects, comprising an upper vibratory grid, elongated openings in said grid arranged substantially parallel to one another and to a direction of advance for longitudinal alignment of the objects and removal of said aligned objects from said apparatus, and conveying means positioned beneath said vibratory grid and substantially parallel thereto for receiving said aligned objects and removing them in a direction substantially parallel to the aligned direction of such objects achieved as they fall through said elongated openings in said grid onto said conveying means and maintaining them in said aligned direction as they are removed from beneath said vibratory grid and said vibratory grid comprising at least two spaced, parallel rods and said conveying means comprising a pair of spaced, parallel endless bands disposed beneath each pair of said rods.

2. Apparatus according to claim 1 in which said vibratory grid comprises a number of parallel spaced bars.

3. Apparatus according to claim 2 in which said bars are round in cross-section.

4. Apparatus according to claim 1 in which said vibratory grid has a direction of advance of objects placed on it which is opposite to the direction of removal of said objects by said conveying means, and further comprising a reject bin at the end of said grid for receiving objects too large to pass through said elongated openings.

5. Apparatus according to claim 1 in which said conveying means comprises a first conveyor means receiving said objects from said grid and a second conveyor means receiving said objects from said first conveyor means, said second conveyor means being arranged to operate at a higher linear speed than said first conveyor means.

6. A method of align elongated objects comprising the steps of depositing said objects on a vibrating grid, said grid having elongated openings substantially aligned with one another and with the intended direction of alignment of said objects and comprising at least two spaced, parallel rods, aligning the objects on said grid, allowing said objects to drop through said openings onto conveyor means comprising a pair of spaced, parallel endless bands disposed beneath each pair of said rods while maintaining their alignment, and removing said objects in the direction in which they have been aligned.

7. A method according to claim 6 in which the said objects are advanced by said vibratory grid in a direction opposite to the direction of removal of said object by said conveyor means.

8. A method according to claim 6 further comprising the step of passing said aligned objects from said conveyor means onto a second conveyor means operating at a higher linear speed, so as to space out said objects further in the direction of advance of those conveyor means.

9. Apparatus for aligning elongated objects, comprising an upper vibratory grid, elongated openings in said grid arranged substantially parallel to one another and to a direction of advance and removal of said aligned objects from said apparatus, and conveying means positioned beneath said vibratory grid for removing aligned objects in a direction substantially parallel to the aligned direction of such objects achieved as they fall through said elongated openings in said grid onto said conveying means; said vibratory grid having a direction of advance of objects placed on it which is opposite to the direction of removal of said objects by said conveying means, and further comprising a reject bin at the end of said grid for receiving objects too large to pass through said elongated openings.

10. Apparatus according to claim 9 in which said vibratory grid comprises a number of parallel spaced bars.

11. Apparatus according to claim 10 in which said bars are round in cross-section.

12. Apparatus according to claim 9 in which said conveying means comprises a first conveyor means receiving said objects from said grid and a second conveyor means receiving said objects from said first conveyor means, said second conveyor means being arranged to operate at a higher linear speed than said first conveyor means.

13. A method of aligning elongated objects comprising the steps of depositing said objects on a vibrating grid, said grid having elongated openings substantially aligned with one another and with the intended direction of alignment of said objects, allowing said objects to drop through said openings onto conveying means, and removing said objects in the direction in which they have been aligned by said conveyor means; said objects being advanced by said vibratory grid in a direction opposite to the direction of removal of said objects by said conveying means.

14. A method according to claim 13 further comprising the step of passing said aligned objects from said conveyor means onto a second conveyor means operating at a higher liner, speed, so as to space out said objects further in the direction of advance of those conveyor means.

15. Apparatus according to claim 1 in which said conveying means removes said aligned objects at a linear speed of at least 0.5 m/s.

16. Apparatus according to claim 1 in which said vibratory grid advances the elongated objects at a linear speeds, said conveying means removing the elongated objects at a linear speed relatively substantially greater than said linear speed of said vibratory grid.

17. The method according to claim 6 in which said step of aligning the objects on said grid includes the step of advancing the objects on said grid at a linear speed, and in which the step of removing said objects on said conveyor means occurs at a linear speed relatively substantially greater than said linear speed of said vibrating grid.

18. A method according to claim 17 in which said step of removing said objects on said conveyor means occurs at a linear speed of at least 0.5 m/s.

* * * * *

UNITED STATES PATENT AND TRADEMARK OFFICE
CERTIFICATE OF CORRECTION

PATENT NO. : 5,641,073
DATED : June 24, 1997
INVENTOR(S) : Milan Fuchs

It is certified that error appears in the above-indentified patent and that said Letters Patent is hereby corrected as shown below:

In Column 4, line 39, delete "align" and substitute therefor ---aligning---;

In Column 4, line 52, delete "object" and substitute therefor ---objects---;

In Column 6, line 4, delete "liner," and substitute therefor ---linear---; and

In Column 6, line 10, delete "speeds," and substitute therefor ---speed,---.

Signed and Sealed this

Ninth Day of September, 1997

Attest:

BRUCE LEHMAN

Attesting Officer

Commissioner of Patents and Trademarks